(12) United States Patent
Lin

(10) Patent No.: US 7,201,785 B2
(45) Date of Patent: Apr. 10, 2007

(54) DUST COLLECTOR FOR VACUUM DEVICE

(76) Inventor: Kun Yi Lin, No. 104, Lane 145, Song Ju Road, Beitun, Taichung (TW) 406

( * ) Notice: Subject to any disclaimer, the term of this patent is extended or adjusted under 35 U.S.C. 154(b) by 357 days.

(21) Appl. No.: 10/896,226

(22) Filed: Jul. 20, 2004

(65) Prior Publication Data

US 2006/0016162 A1  Jan. 26, 2006

(51) Int. Cl.
*B01D 29/13* (2006.01)
(52) U.S. Cl. .............................. 55/356; 55/422; 55/492
(58) Field of Classification Search .................. 55/428, 55/429, 422, 475, 492, 356
See application file for complete search history.

(56) References Cited

U.S. PATENT DOCUMENTS 3,358,316 A    12/1967  Okun
3,747,307 A *  7/1973  Peshina et al. ................ 55/379
5,623,744 A    4/1997  Triplett et al. ................ 15/326
5,813,085 A    9/1998  Fritz et al. .................... 15/314

\* cited by examiner

*Primary Examiner*—Robert Hopkins
(74) *Attorney, Agent, or Firm*—Charles E. Baxley

(57) ABSTRACT

A dust collector includes a base, a cover, and a barrel disposed between the base and the cover. The barrel includes a lower frame, an upper frame, one or more intermediate frames, and one or more telescopic tubes selectively secured to the frames, to form a spatial structure for the barrel, and the barrel is collapsible to a collapsed structure when the telescopic tube is disengaged from the lower and the upper and the intermediate frames. The intermediate frames may be received within the upper frame, and the lower frame may be received in the intermediate frames. The dust bag may be attached to the barrel with hooks or catches or clamping rings.

7 Claims, 6 Drawing Sheets

DUST COLLECTOR FOR VACUUM DEVICE

BACKGROUND OF THE INVENTION

1. Field of the Invention

The present invention relates to a dust collector, and more particularly to a dust collector having a collapsible barrel for sustaining a dust bag in a widely opened configuration.

2. Description of the Prior Art

Typical vacuum devices or facilities comprise one or more dust collectors disposed therein and coupled to a vacuum port, for receiving and collecting vacuumed objects or particles or dust.

For example, U.S. Pat. No. 3,358,316 to Okun discloses one of the typical vacuum devices or facilities comprise a dust collector including a dust bag disposed or engaged onto a barrel formed by wires, for receiving and collecting vacuumed objects or particles or dust. The barrel may retain or sustain the dust bag in a widely opened configuration.

However, the barrel is solidly secured to the vacuum devices or facilities, and may not be removed from the vacuum devices or facilities. In addition, the barrel is made of wires that are solidly secured together to a solid and non-collapsible structure, such that the barrel for the dust collectors includes a large volume that is adverse for transportation or storing purposes.

U.S. Pat. No. 5,623,744 to Triplett et al. discloses another typical vacuum device or facility comprising a collection barrel coupled to a vacuum port, for receiving and collecting vacuumed objects or particles or dust. However, after the collection barrel has been completely or fully filled with the collected and vacuumed objects or particles or dust, the collection barrel should be moved to a dump for removing the collected and vacuumed objects or particles or dust from the collection barrel, and the workers will also breathe the dusty air when dumping the collected and vacuumed objects or particles or dust from the collection barrel.

U.S. Pat. No. 5,813,085 to Fritz et al. discloses a further typical vacuum device or facility comprising a collection bag received in a canister and/or a bucket, to receive and to collect vacuumed objects or particles or dust. However, no barrel or other sustaining device may be used to sustain the collection bag in a widely opened configuration.

The present invention has arisen to mitigate and/or obviate the afore-described disadvantages of the conventional dust collectors for vacuum facilities.

SUMMARY OF THE INVENTION

The primary objective of the present invention is to provide a dust collector including a collapsible barrel for sustaining a dust bag in a widely opened configuration, and for being easily removed from the dust bag after the dust bag has been completely or fully filled with the collected and vacuumed objects or particles or dust.

In accordance with one aspect of the invention, there is provided a dust collector comprising a base, a cover, and a barrel disposed between the base and the cover, the barrel including a lower frame, an upper frame, at least one intermediate frame, and at least one telescopic tube selectively secured to the lower and the upper and the intermediate frames, to form a spatial structure for the barrel, and the barrel being collapsible to a collapsed structure when the telescopic tube is disengaged from the lower and the upper and the intermediate frames.

The upper frame includes a diameter greater than that of the intermediate frame, to allow the intermediate frame to be received or stored within the upper frame. The intermediate frame includes a diameter greater than that of the lower frame, to allow the lower frame to be received or stored within the intermediate frame.

The telescopic tube includes at least two pipes slidably engaged with each other, and extendible out from each other to an outwardly extended position, and retractable relative to each other to a collapsed position.

The base includes at least one wheel attached thereto, for allowing the base and the dust collector to be moved on ground. The upper frame includes at least one catch attached thereto, for attaching the dust bag to the barrel. A clamping ring may further be provided and selectively attachable onto the upper frame, to solidly secure the dust bag to the barrel.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
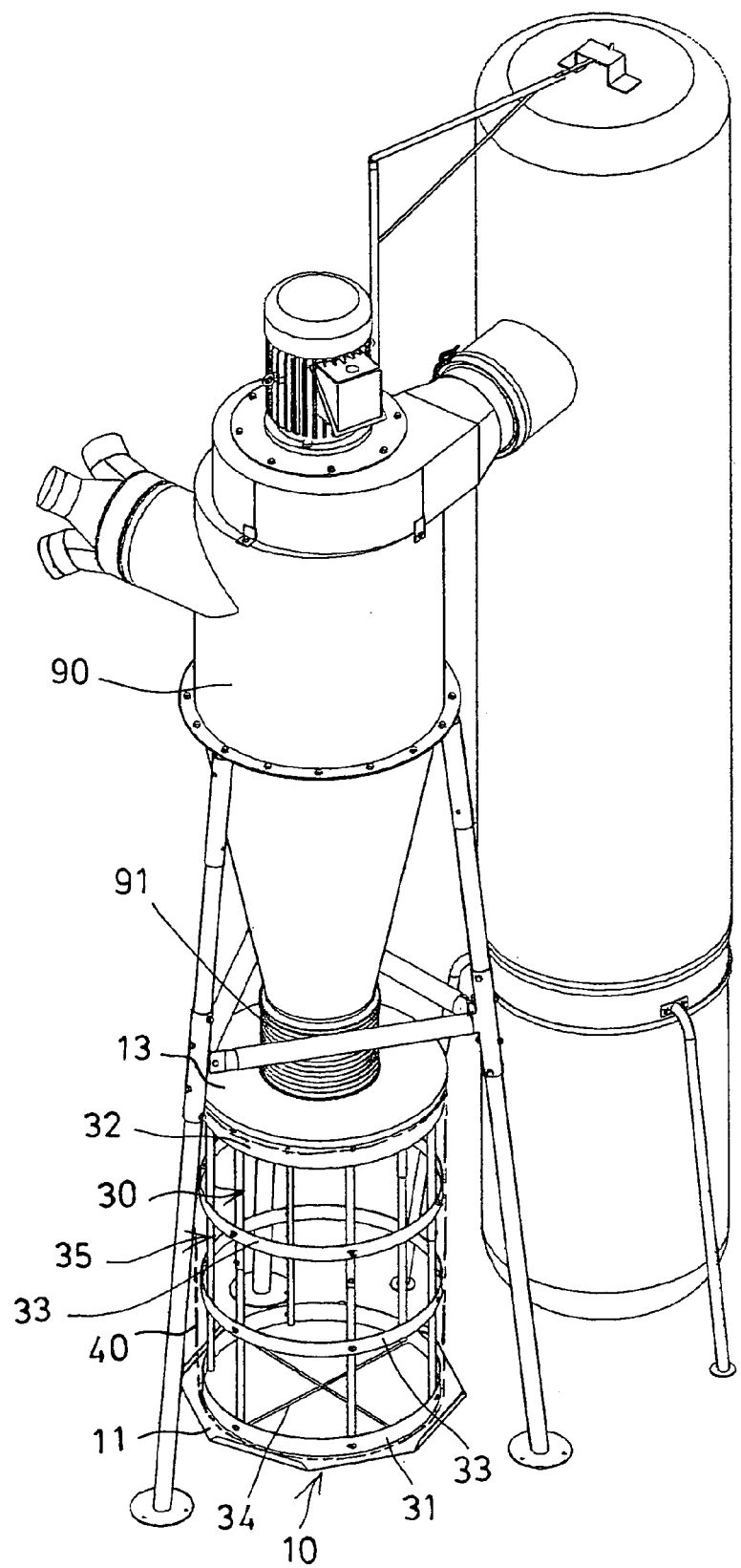
FIG. 1 is a perspective view illustrating an attachment of a dust collector in accordance with the present invention to a vacuum device.

Referring to the drawings, and initially to FIG. 1, a dust collector 10 in accordance with the present invention is provided for attaching to various vacuum devices or facilities 90, such as for coupling to a vacuum port 91 of the vacuum devices or facilities 90, for receiving and collecting vacuumed objects or particles or dust from the vacuum devices or facilities 90.

Figure 2:
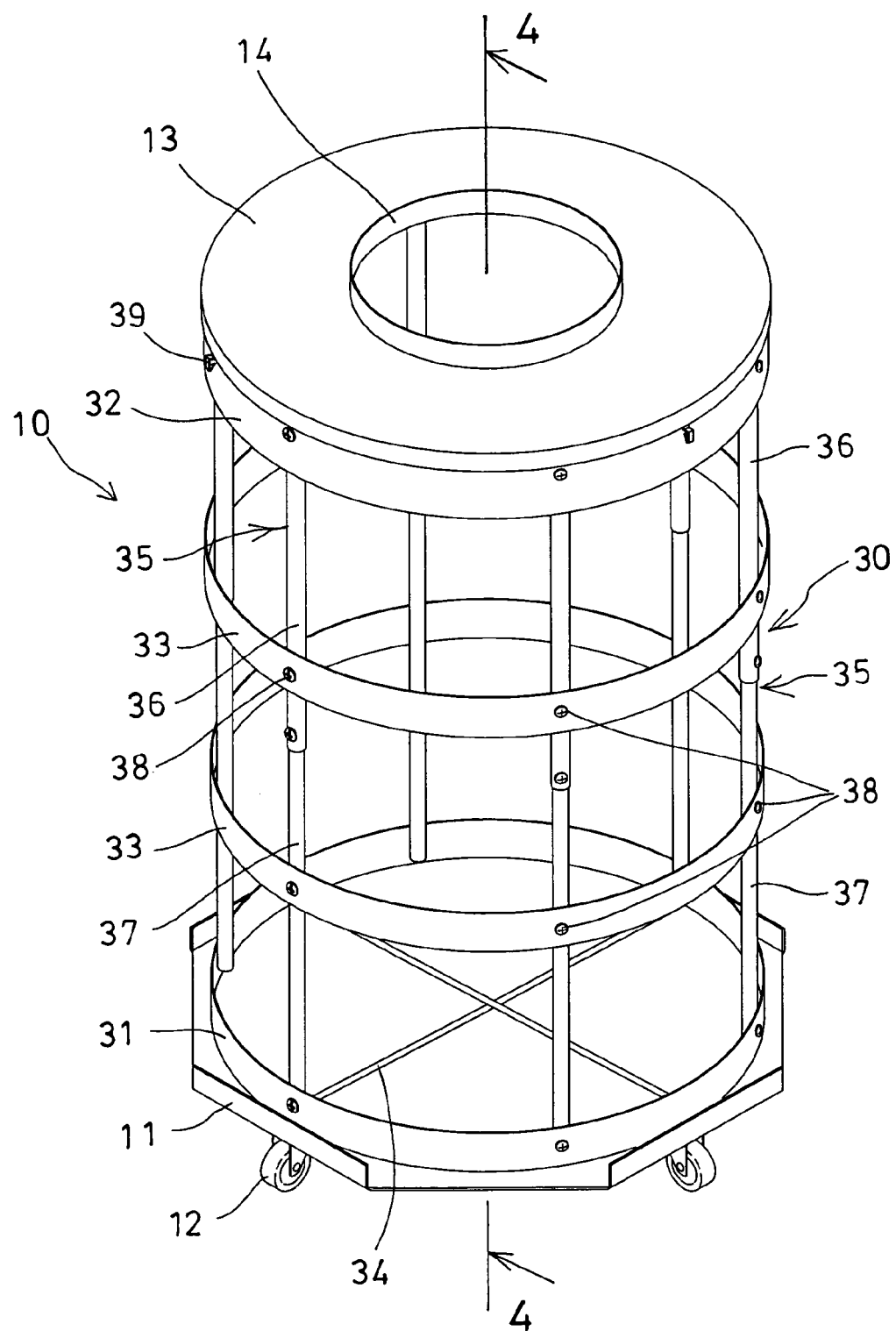
FIG. 2 is a perspective view of the dust collector for the vacuum device.
Figure 3:
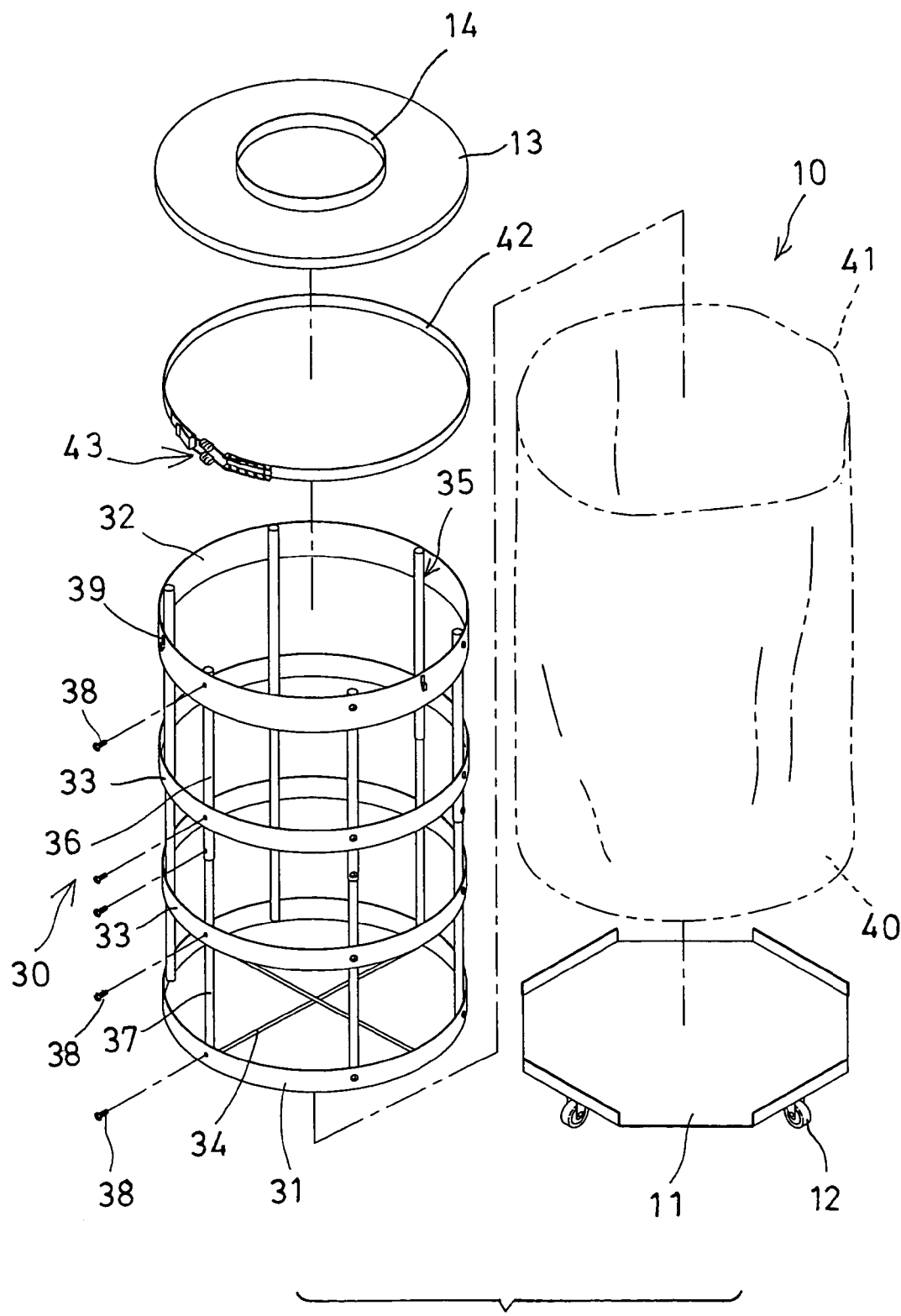
FIG. 3 is a partial exploded view of the dust collector.
Figure 4:
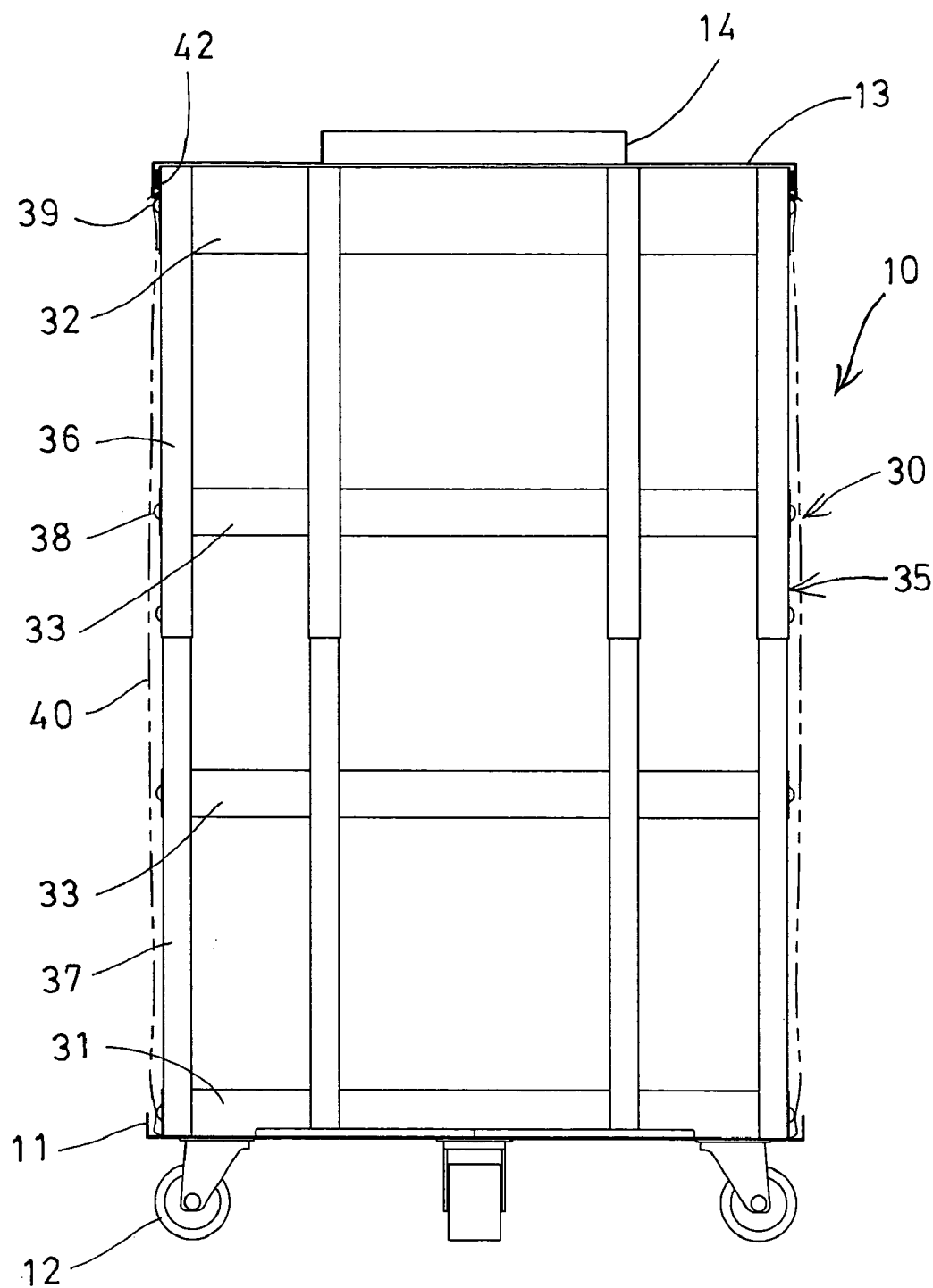
FIG. 4 is a partial cross sectional view of the dust collector, taken along lines 4—4 of FIG. 2.

Referring next to FIGS. 2–4, the dust collector 10 comprises a base 11 having one or more wheels 12 attached thereto, for allowing the base 11 and thus the dust collector 10 to be moved on supporting surfaces or ground, a barrel 30 disposed on the base 11, and a cover 13 attached onto the barrel 30 and having a mouth 14 for coupling to the vacuum port 91, and thus for receiving and collecting vacuumed objects or particles or dust from the vacuum devices or facilities 90.

The barrel 30 includes a lower frame 31, an upper frame 32, one or more intermediate frames 33, and one or more telescopic tubes 35 secured to the frames 31–33 with fasteners 38, to form a spatial or opened or constructed structure for the barrel 30. One or more bars 34 may be secured in the lower frame 31 to reinforce the lower frame 31.

Figure 7:
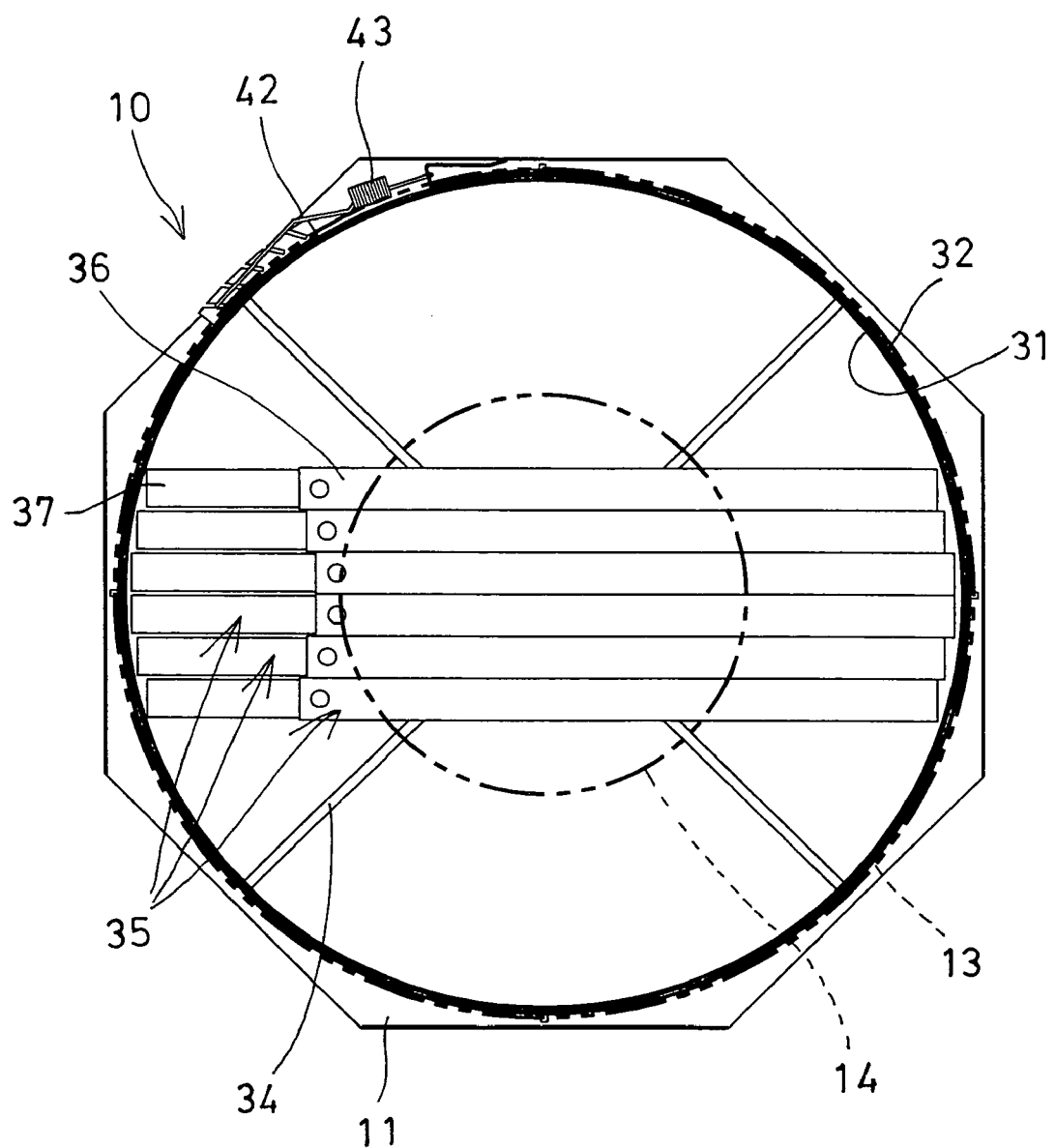
FIG. 7 is a top plan view illustrating the dust collector as shown in FIG. 6, which is in a collapsed or retracted configuration.

The upper frame 32 includes a diameter greater than that of the intermediate frames 33, to allow the intermediate frames 33 to be received or stored within the upper frame 32, and the intermediate frames 33 includes a diameter greater than that of the lower frame 31, to allow the lower frame 31 to be received or stored within the intermediate frames 33 (FIG. 7).

Figure 6:
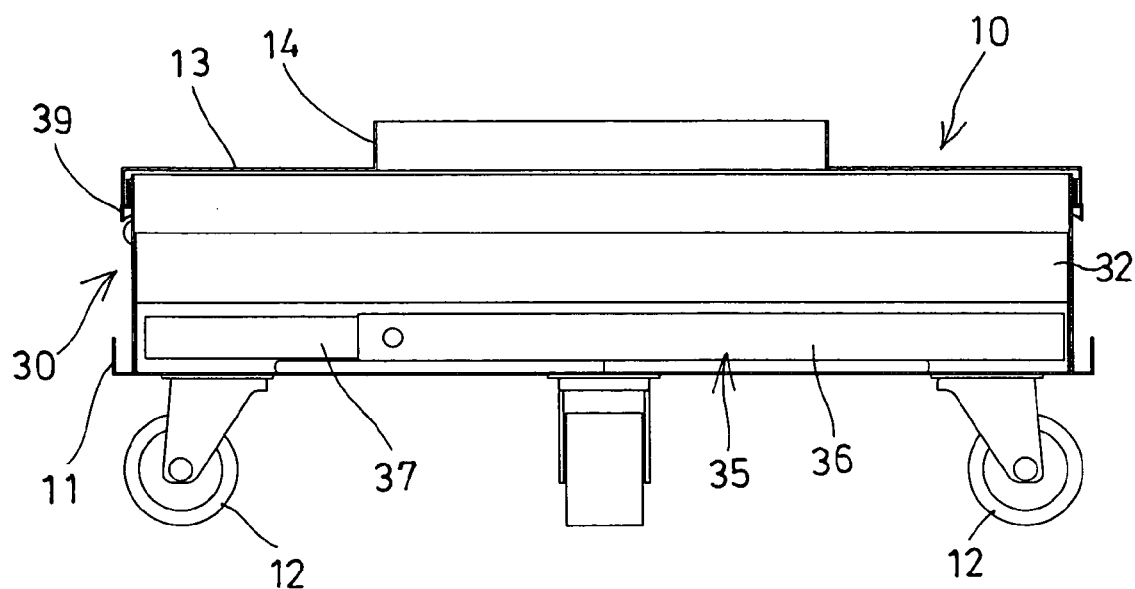
FIG. 6 is a front plan view illustrating the dust collector in a collapsed or retracted configuration.

Each of the telescopic tubes 35 may include two or more pipes 36, 37 slidably engaged with each other, and extendible out from each other to an outwardly extended or working position (FIGS. 2–4), and retractable relative to each other to a receiving or collapsed or stored position (FIGS. 6, 7). One or more hooks or catches 39 may be attached onto an outer peripheral portion of the upper frame 32, for hooking or attaching a dust bag 40 onto the barrel 30.

Figure 5:
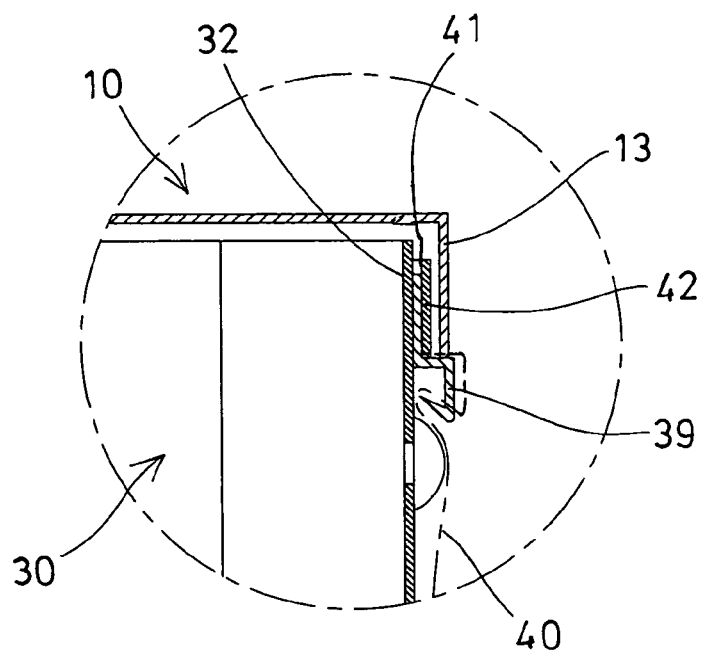
FIG. 5 is an enlarged partial cross sectional view illustrating the operation of the dust collector.

For example, as shown in FIGS. 4 and 5, the dust bag 40 may be attached or engaged onto the outer peripheral portion of the barrel 30, to have an upper opened or peripheral portion 41 of the dust bag 40 hooked or attached or coupled to the catches 39. A clamping ring 42 may further be provided and attached or engaged onto the outer peripheral portion of the upper frame 32, to solidly secure the dust bag 40 to the barrel 30.

The clamping ring 42 may include a quick release device 43 or a spring member 43 provided thereon, to quickly attach or secure the upper peripheral portion 41 of the dust bag 40 to the barrel 30, and thus to allow the dust bag 40 to be quickly disengaged or removed from the barrel 30.

It is to be noted that the dust bag 40 may be attached or engaged onto the barrel 30, and the barrel 30 may thus be relatively received in the dust bag 40, such that the dust bag 40 may be retained or sustained in a widely opened configuration, for allowing the collected and vacuumed objects or particles or dust to be suitably received or collected within the dust bag.

In addition, after the dust bag has been completely or fully filled with the collected and vacuumed objects or particles or dust, the barrel 30 may be easily and quickly removed from the dust bag 40, without dumping the collected and vacuumed objects or particles or dust from the dust bag 40.

After use or when the dust collector 10 is required to be stored or transported to the other places, as shown in FIG. 7, the lower frame 31 may be received or stored within the intermediate frames 33, and the intermediate frames 33 may be received or stored within the upper frame 32 after the telescopic tubes 35 are disengaged from the frames 31–33. In addition, the telescopic tubes 35 may also be retracted or collapsed to the receiving or collapsing or storing position (FIGS. 6, 7), to allow the dust collector 10 to be retracted or collapsed to a compact collapsing or storing position that is excellent for storing or transportation purposes.

Accordingly, the dust collector in accordance with the present invention includes a collapsible barrel for sustaining a dust bag in a widely opened configuration, and for being easily removed from the dust bag after the dust bag has been completely or fully filled with the collected and vacuumed objects or particles or dust.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A dust collector comprising:
a base,
a cover, and
a barrel disposed between said base and said cover, said barrel including a lower frame, an upper frame, at least one intermediate frame, and at least one telescopic tube selectively secured to said lower and said upper and said at least one intermediate frames, to form a spatial structure for said barrel, and said barrel being collapsible to a collapsed structure when said at least one telescopic tube is disengaged from said lower and said upper and said at least one intermediate frames.

2. The dust collector as claimed in claim 1, wherein said upper frame includes a diameter greater than that of said at least one intermediate frame, to allow said at least one intermediate frame to be received or stored within said upper frame.

3. The dust collector as claimed in claim 1, wherein said at least one intermediate frame includes a diameter greater than that of said lower frame, to allow said lower frame to be received or stored within said at least one intermediate frame.

4. The dust collector as claimed in claim 1, wherein said at least one telescopic tube includes at least two pipes slidably engaged with each other, and extendible out from each other to an outwardly extended position, and retractable relative to each other to a collapsed position.

5. The dust collector as claimed in claim 1, wherein said base includes at least one wheel attached thereto, for allowing said base and said dust collector to be moved on ground.

6. The dust collector as claimed in claim 1, wherein said upper frame includes at least one catch attached thereto, for attaching a dust bag to said barrel.

7. The dust collector as claimed in claim 1 further comprising a clamping ring selectively attachable onto said upper frame for securing a dust bag to said barrel.

\* \* \* \* \*